United States Patent
Rizzo (10) Patent No.: US 9,337,684 B2
(45) Date of Patent: May 10, 2016

(54) BATTERY CHARGING DEVICE AND METHOD

(75) Inventor: Ronald A. Rizzo, Menomonee Falls, WI (US)

(73) Assignee: Johnson Controls Technology Company, Holland, MI (US)

( * ) Notice: Subject to any disclaimer, the term of this patent is extended or adjusted under 35 U.S.C. 154(b) by 849 days.

(21) Appl. No.: 12/990,618

(22) PCT Filed: May 6, 2009

(86) PCT No.: PCT/US2009/002797
§ 371 (c)(1),
(2), (4) Date: Nov. 23, 2010

(87) PCT Pub. No.: WO2009/137054
PCT Pub. Date: Nov. 12, 2009

(65) Prior Publication Data
US 2011/0057624 A1    Mar. 10, 2011

Related U.S. Application Data

(60) Provisional application No. 61/050,687, filed on May 6, 2008.

(51) Int. Cl.
    *H02J 7/00*    (2006.01)
(52) U.S. Cl.
    CPC .................... *H02J 7/0075* (2013.01)
(58) Field of Classification Search
    USPC .................. 320/152, 160, 162, 131
    See application file for complete search history.

(56) References Cited

U.S. PATENT DOCUMENTS

| | | | | | |
|---|---|---|---|---|---|
| 4,952,861 | A | * | 8/1990 | Horn | 320/133 |
| 5,469,043 | A | * | 11/1995 | Cherng | H02J 7/0006 |
| | | | | | 320/161 |
| 5,617,007 | A | * | 4/1997 | Keidl et al. | 320/141 |
| 5,637,981 | A | * | 6/1997 | Nagai | H02J 7/0019 |
| | | | | | 320/116 |
| 5,691,620 | A | * | 11/1997 | Nagai et al. | 320/106 |
| 5,729,117 | A | * | 3/1998 | Fukuda | 320/117 |
| 5,969,506 | A | | 10/1999 | Neal | |
| 6,184,650 | B1 | * | 2/2001 | Gelbman | 320/100 |
| 6,414,465 | B1 | * | 7/2002 | Banks et al. | 320/118 |
| 8,013,577 | B2 | * | 9/2011 | Nishino | 320/162 |
| 2002/0024321 | A1 | * | 2/2002 | Rouverand et al. | 320/150 |
| 2007/0188134 | A1 | * | 8/2007 | Hussain et al. | 320/114 |
| 2007/0267997 | A1 | * | 11/2007 | Kanazawa | H02J 7/16 |
| | | | | | 320/108 |

OTHER PUBLICATIONS

P.H.L. Notten et al., "Boostcharging Li-ion Batteries: A challenging new charging concept", Journal of Power Sources, vol. 145, 2005, pp. 89-94.*
P.H.L. Notten et al, "Boost Charging Li-ion batteries: A challenging new charging concept", 2005, Journal of Power Sources, vol. 145, pp. 89-94.*
P.H.L. Notten et al., "Boost Charging Li-ion Batteries: A Challenging New Charging Concept", 2005, Journal of Power Sources, vol. 145, pp. 89-94.*

* cited by examiner

*Primary Examiner* — Richard Isla Rodas
*Assistant Examiner* — Michael Dibenedetto
(74) *Attorney, Agent, or Firm* — Boardman & Clark LLP (57) ABSTRACT

An improved battery charging method is usable by a battery charger to charge a battery. The charging method may include an optional desulfation process, a first constant current process, a constant voltage process, a second constant current process and a float charge process. The charging method preferably improves various charge and usage characteristics of the battery through a single or continued use of the battery charger utilizing the charging method.

19 Claims, 10 Drawing Sheets

FIG. 8 ated (VRLA) batteries, gel batteries, etc.). In general, a
BATTERY CHARGING DEVICE AND METHOD This application claims priority to U.S. Provisional Application No. 61/050,687, filed May 6, 2008, and International Application No. PCT/US2009/002797 filed May 6, 2009, both of which are incorporated herein by reference in their entirety.

BACKGROUND

1. Field of the Invention

The present inventions relate to a method of charging a battery, a charging device and a charging system for a battery. The present inventions more specifically relate to an improved device and method for charging a secondary battery and extending battery life.

2. Background of the Invention

It is known to provide for a secondary battery that may be used for powering stationary and portable devices. It is also known to provide such secondary batteries to start and/or power vehicles such as boats, cars and the like and that use various chemistries (e.g., nickel cadmium batteries, nickel metal hydride batteries, lithium ion batteries, lithium ion polymer batteries, or lead acid batteries designated as, for example, starting, lighting and ignition (SLI) batteries, deep cycle batteries, absorbent glass mat (AGM) batteries, valve regulated (VRLA) batteries, gel batteries, etc.). In general, a secondary battery is a rechargeable battery that uses a reversible chemical reaction to provide a potential difference across two poles. Secondary batteries can be recharged by providing a current to the battery and reversing the chemical reaction used by the battery to provide energy.

It is also known to provide a charger that charges a secondary battery. Battery chargers are used to reverse the chemical reaction that the battery uses to provide energy. Simple chargers may provide a constant voltage and/or a constant current to the battery and generally do not monitor the battery state or alter the provided voltage and/or current during the charging process. As such, simple chargers can easily overcharge and damage a battery. Chargers that are more complex may use a charging method to monitor one or more characteristics of the battery and/or alter the supplied voltage and/or current to charge the battery to full capacity more safely and/or efficiently (e.g., by avoiding overcharging the battery).

SUMMARY

An exemplary method of charging a battery with a battery charger includes applying a first substantially constant current to the battery, applying a first substantially constant voltage to the battery, applying a second substantially constant current to the battery and applying a second substantially constant voltage to the battery.

An exemplary method of charging a battery with a battery charger includes providing the battery with a first substantially constant current until either a voltage of the battery reaches a first desired value or a first time period has expired. The method also includes providing the battery with a first substantially constant voltage until either a current of the battery reaches a desired value or a second desired time period has expired. The method also includes providing the battery with a second substantially constant current until either the voltage of the battery reaches a second desired value or a third desired time period has expired. The method also includes providing the battery with a second substantially constant voltage.

An exemplary battery charging method includes a first current applying step or process, a voltage applying step or process, a second current applying step or process and a float charge applying step or process.

In various exemplary embodiments, a current applying step or process includes providing a battery with a substantially constant current until a voltage of the battery reaches a desired value or a desired time period has expired.

In various exemplary embodiments, a voltage applying step or process includes providing a battery with a substantially constant voltage until a current of the battery reaches a desired value or a desired time period has expired.

In various exemplary embodiments, a float charge applying step or process includes providing a battery with a substantially constant voltage. In various exemplary embodiments, the float charge process includes providing a tapering current. In various exemplary embodiments, the substantially constant voltage and/or tapering current substantially counteracts a self-discharge rate of the battery.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF DRAWINGS

Various exemplary embodiments of the systems and methods according to this invention will be described in detail, with reference to the following figures, wherein.

DETAILED DESCRIPTION

It should be appreciated that the following description addresses, in part, charging systems. In various embodiments, a charging system includes a secondary battery and a charging device. In various embodiments, the charging system may include multiple batteries and/or charging devices.

The secondary battery may be any known or later-developed rechargeable battery. In various embodiments, the battery is a lead acid battery. In various embodiments, the battery includes substantially immobilized electrolyte. In various embodiments, the battery includes absorbent-glass-mat separators (AGM). According to various exemplary embodiments, the battery is of a type commercially available under the brand Optima from Johnson Controls, Inc., Milwaukee, Wis. According to an exemplary embodiment, the battery is of a type commercially available under the brand Optima group 31 marine batteries available from Johnson Controls, Inc., Milwaukee, Wis.

In various exemplary embodiments, the charging device (e.g., a battery charger), includes a microprocessor. In various exemplary embodiments, the charging device includes memory. In various exemplary embodiments, the microprocessor and/or memory include instructions according to a charging method to be executed by the microprocessor.

As outlined above, a battery charger may utilize a charging method to charge a battery. A charging method is a series of steps that a battery charger uses to help optimize the charging of a battery. Charging methods help or allow a charger to determine when to and/or change supplied voltage and/or current levels to safely and/or efficiently charge the battery to a full charge.

Charging methods according to exemplary embodiments may improve characteristics of the battery related to, for example, a final charge capacity of the battery, an overall time period required to charge the battery, a life span of the battery (e.g., a length of time before the battery fails and/or a number of charge/discharge cycles of the battery before the battery fails) and/or any other known or later-developed qualities of charging and/or using a battery. For example, a charging method may desirably increase or substantially maintain the charge capacity of a battery by eliminating, preventing or reducing the level of sulfation on one or more plates of the battery. Such charging methods may thus reduce the likelihood that a battery will fail, die or become unreliable do to a build up of crystallized sulfates on the electrodes, or reduction of electrolyte due to water loss. Likewise, a charging method may desirably increase or substantially maintain the charge capacity of a battery by counteracting a self-discharge rate of the battery.

Additionally, charging methods according to exemplary embodiments may help effectively recharge a battery that has been partially or completely discharged, deeply discharged or over-discharged. Likewise, charging methods according to exemplary embodiments of this invention may help reliably recharge a battery to a full or nearly full capacity.

It should be appreciated that, in various exemplary embodiments, as the battery is charged, the resistance between the terminals increases. As such, as the battery is charged, the voltage across the terminals will increase and/or the current across the terminals will decrease. Typically, either a substantially constant current or a substantially constant voltage may be applied to the battery such that if a substantially constant current is applied, the voltage across the terminals will increase as the battery charges; and if a substantially constant voltage is applied, the current across the terminals will decrease as the battery charges.

In various exemplary embodiments, a charging method according to this invention includes applying a first current, applying a voltage and applying a float charge. Various exemplary embodiments also include applying a second current. Various exemplary embodiments also include an optional desulfation step or process.

Figure 1:
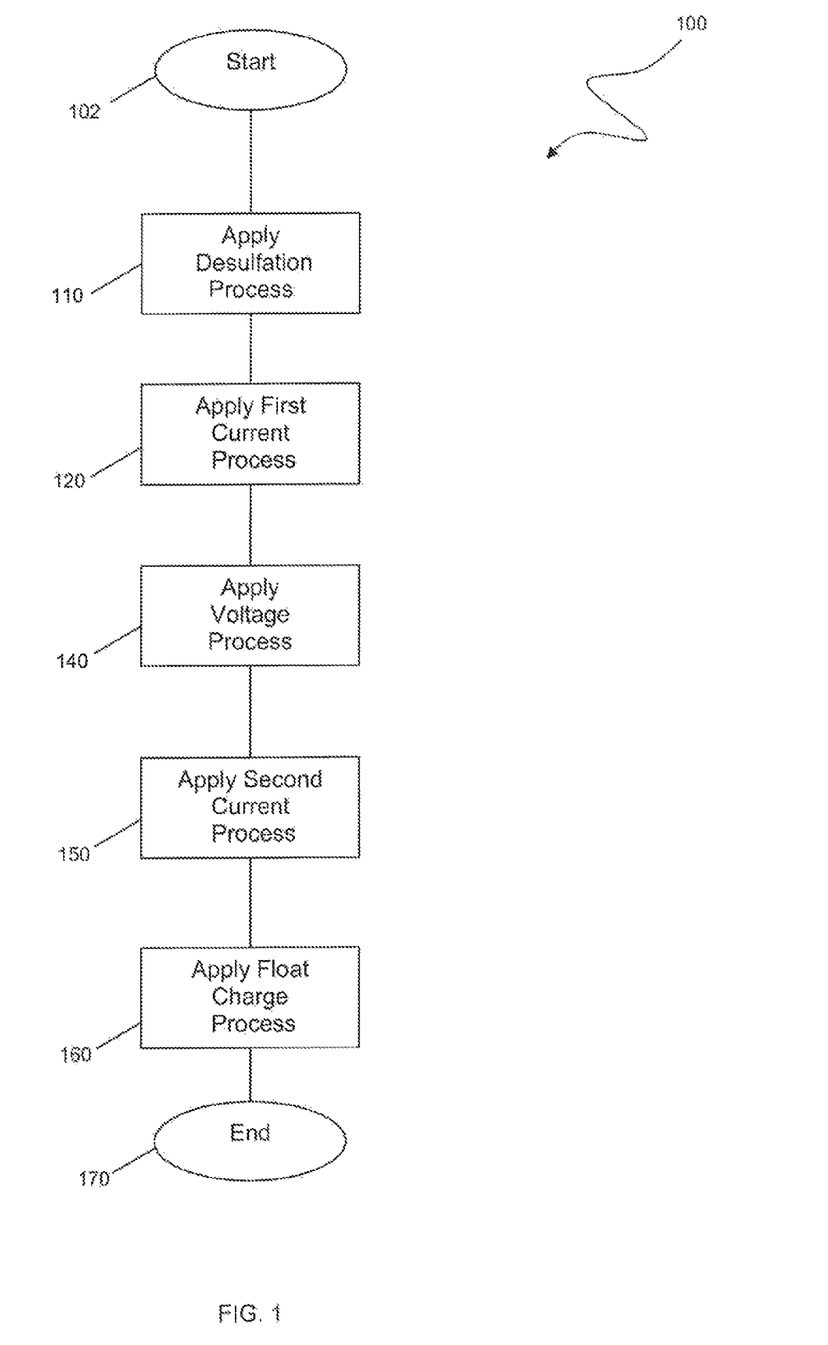
FIG. 1 is a flowchart representing a charging method according to an exemplary embodiment.

FIG. 1 is a flowchart outlining one exemplary embodiment of a charging method 100. As shown in FIG. 1, the charging method 100 begins at step 102 and continues to step 110, where a desulfation process is applied to the battery. Then, in step 120, a first current process is applied to the battery. Next, in step 140, a voltage process is applied to the battery. Operation then continues to step 150.

In step 150, a second current process is applied to the battery. Then, in step 160, a float charge process is applied to the battery. Operation then continues to step 170, where the method ends. It should be appreciated that the float charge process applied in step 160 may be utilized to maintain the battery in a substantially fully charged state. As such, operation may continue in step 160 indefinitely and/or until the battery is removed from the battery charger.

It should be appreciated that, in various embodiments, various ones of steps 110-160 may be omitted. For example, the desulfation process performed in step 110, may be omitted. In this case, operation of the method continues from step 102 directly to step 120. The second current process applied in step 150 may also be omitted. In this case, operation of the method continues from step 140 to step 160.

It should also be appreciated that, in each step 110-160 of the charging method 100, a determination when to move from a present step or process to a next step or process may be based upon any number of factors, including a voltage of the battery, a current of the battery, a temperature of the battery, a manual prompt from a user and/or an amount of time elapsed since the beginning of the present step or process.

Figure 2:
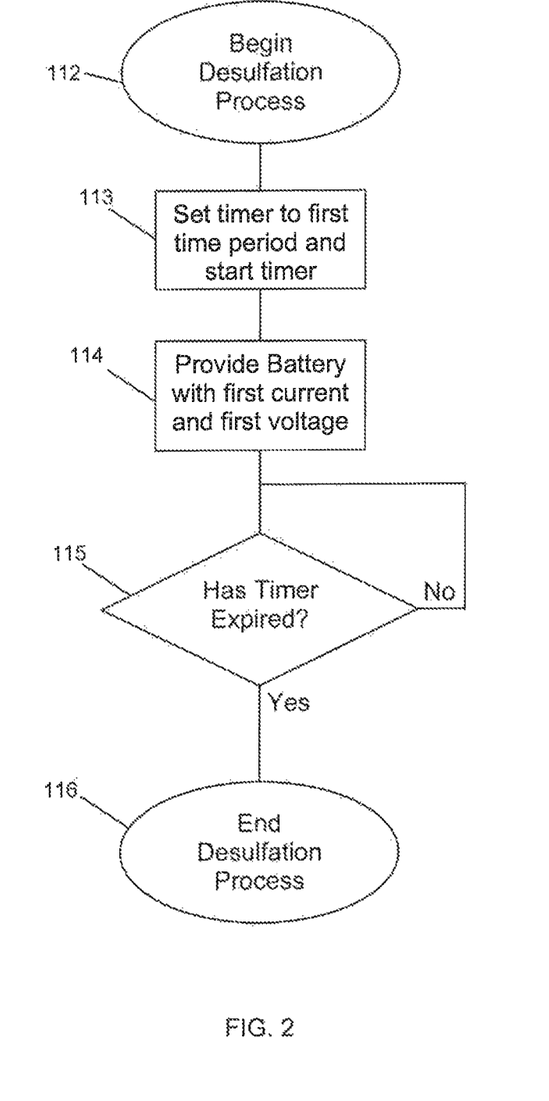
FIG. 2 is a flowchart representing a desulfation process according to an exemplary embodiment.

FIG. 2 is a flowchart outlining one exemplary embodiment of the desulfation process performed in step 110 shown in FIG. 1. As shown in FIG. 2, the desulfation process begins at step 112 and continues to step 113, where a timer is set to a first time period and the timer is started. Then, in step 114, the battery is provided with a first voltage and a first current.

In step 115, a determination is made whether the first time period has expired. If the first time period has not expired, operation remains in step 115 until the first time period has expired. Once the first time period has expired, operation continues to step 116, where the desulfation process is ended.

In various exemplary embodiments, the first voltage is substantially constant and has a value between about 15.3 volts and about 18.0 volts. In various ones of these exemplary embodiments, the first voltage has a value between about 15.7 volts and about 17.5 volts.

It should also be appreciated that during the desulfation process, the current of the battery may vary depending on the conditions of the battery (e.g., state of charge, level of sulfation, applied voltage, etc.). In various exemplary embodiments, the current of the battery varies or is varied within a range of about 0.5 amps and about 3.0 amps. In various ones of these exemplary embodiments, the current of the battery varies or is varied within a range of about 1.0 amps and about 2.5 amps. It should also be appreciated that the current of the battery may alternatively be substantially constant. In various exemplary embodiments, the current remains substantially constant if the first voltage is greater than about 17.4 volts. In various other exemplary embodiments, the current may decrease or be decreased if the first voltage is less than about 17.4 volts.

The above-outlined desulfation process may help break up (e.g., disintegrate, disperse or dissolve) lead sulfate crystals that have accumulated on the plates of the battery. By breaking up the crystallized lead sulfates, the available surface area of the plates may be increased and the available capacity of the battery may be increased and, ideally, substantially restored to its original value. Typically, the desulfation step is optional, but if used is the first step of the charging method 100 according to various embodiments. The desulfation process may continue for a desired time length, which may be preset to a length from about 15 minutes to as much as about 48 hours. In various exemplary embodiments, the desulfation step is preset to continue for up to about 36 hours.

Figure 3:
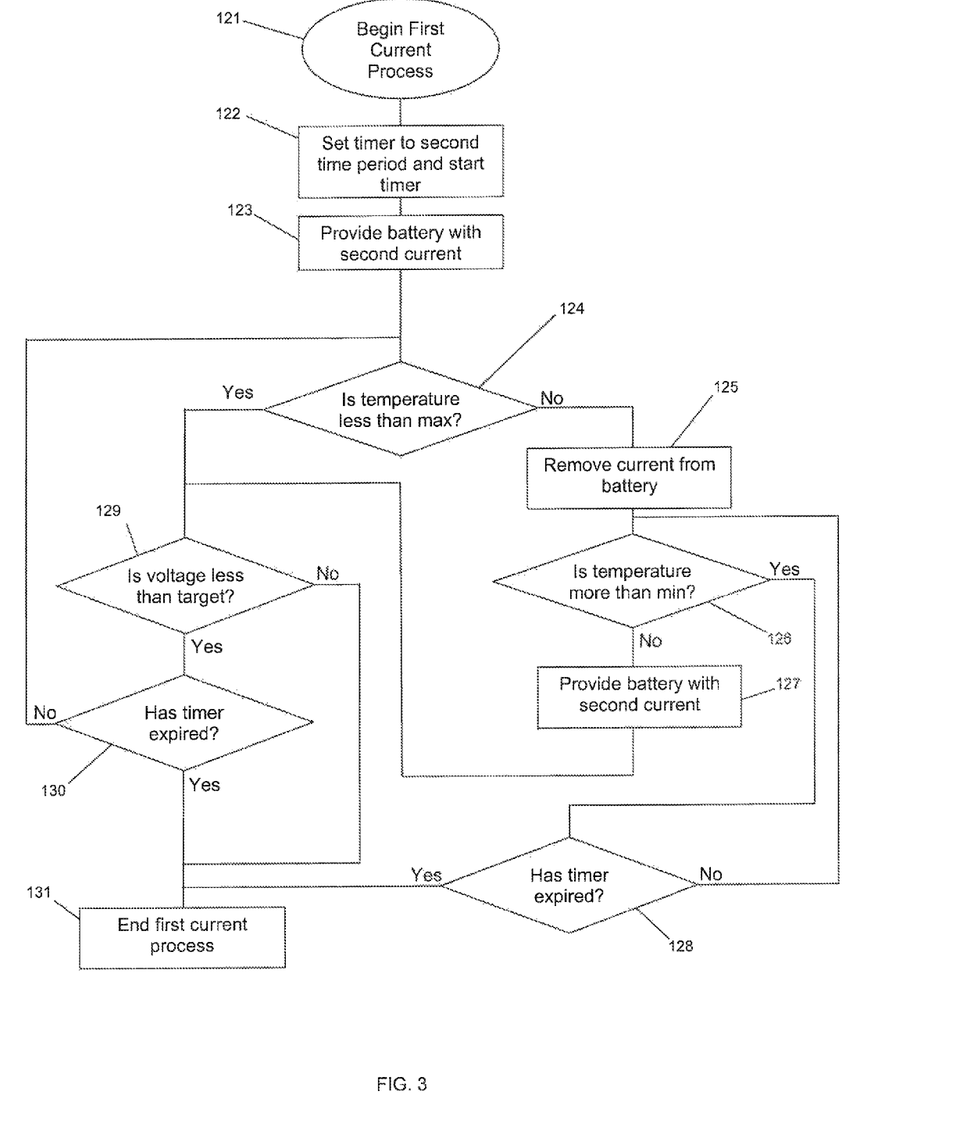
FIG. 3 is a flowchart representing a first current process according to an exemplary embodiment.

FIG. 3 is a flowchart outlining one exemplary embodiment of the first current process shown at step 120 in FIG. 1. As shown in FIG. 3, operation of the first current process begins in step 121 and continues to step 122. At step 122, a timer is set to a second time period and the timer is started. Then, in step 123, the battery is provided with a second current. Operation then continues to step 124.

It should be appreciated that, in various exemplary embodiments, the second current is substantially constant. As such, while the second current is applied to the battery, the voltage of the battery will tend to increase. Additionally, as the second current is applied to the battery, a temperature of the battery may increase.

In step 124, a determination is made whether the temperature of the battery is below a maximum value. If the temperature of the battery is not below the maximum value (e.g., the temperature of the battery has reached a predefined threshold), operation continues to step 125. Otherwise, if the temperature is below the maximum value, operation jumps to step 129. In step 125, the current (e.g., the current applied at step 123) is removed from the battery. It should be appreciated that, by removing the current from the battery, the battery will no longer be increasing in temperature and may begin to equalize with the temperature of the environment around the battery. Next in step 126, a determination is made whether the temperature of the battery is above a minimum value. If the temperature is above the minimum value, operation jumps to step 128. Otherwise, if the temperature is at or below the minimum value (e.g., the battery has sufficiently cooled), operation continues to step 127, where the current is again applied to the battery. Operation then jumps to step 129.

In step 128, a determination is made whether the timer has expired. If the timer has expired, operation jumps to step 131. Otherwise, if the timer has not expired, operation jumps back to step 126. Thus, operation continues to loop through steps 126-128 until the battery has sufficiently cooled or the timer has expired.

In step 129, a determination is made whether the present voltage of the battery has reached a desired target value. If the voltage of the battery has not reached the desired target value (e.g., the voltage is still below a desired threshold), operation continues to step 130. Otherwise, if the voltage of the battery has reached the desired target value (e.g., the voltage has risen up to or above a desired threshold), operation jumps to step 131. In step 130, a determination is made whether the second time period has expired. If the second time period has not expired, operation jumps back to step 124; otherwise, operation continues to step 131, where the first current process is ended.

In various exemplary embodiments, the first current process provides the second current within a range of about 5 amps to about 100 amps until the voltage of the battery increases to a desired voltage level, which is typically within the range of about 14.5 volts to about 18.0 volts. In various embodiments, the first current process provides the second current within a range of about 10 amps to about 40 amps. In various exemplary embodiments, the first current process provides the second current within a range of about 25 to about 30 amps. In various embodiments, the first current process provides the second current until the voltage increases to a desired target level within the range of about 14.8 volts to about 16.0 volts. The first current process may take from between about 15 minutes to about 18 hours and may be terminated after a specified (e.g., preselected) length of time, regardless of the then-present voltage level, to, for example, help prevent overcharging. In various embodiments, the first current process may take from about 2 hours to about 4 hours.

It should be appreciated that steps 124 to 128 may be omitted. In this case, the temperature of the battery is not monitored and the operation continues from step 123 directly to step 129. In various exemplary embodiments that include steps 124 to 128, the first current process includes monitoring or otherwise reading the temperature of the battery and the first current process may be stopped at least temporarily if the temperature of the battery reaches a specified (e.g. preselected) limit. In various exemplary embodiments, the specified temperature limit is about 150 deg F. In various other exemplary embodiments, the specified temperature limit is about 125 deg F.

Figure 4:
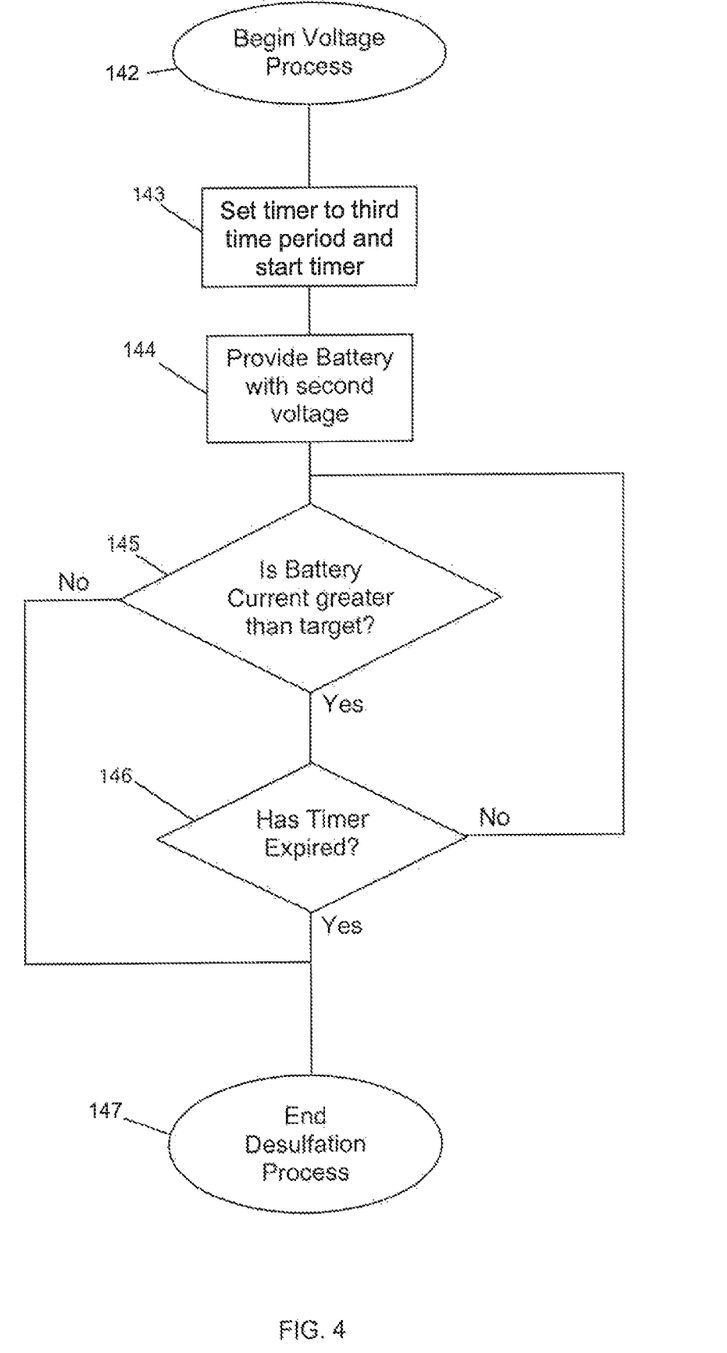
FIG. 4 is a flowchart representing a voltage process according to an exemplary embodiment.

FIG. 4 is a flowchart outlining one exemplary embodiment of the voltage process performed at step 140 shown in FIG. 1. As shown in FIG. 4, operation begins in step 142 and continues to step 143. At step 143, the timer is set to a third time period and the timer is started. Then, in step 144, the battery is provided with a second voltage. Operation then continues to step 145.

It should be appreciated that, in various exemplary embodiments, the second voltage is substantially constant. As such, while the second voltage is applied to the battery, the current of the battery tends to decrease. In step 145, a determination is made whether the then-present current of the battery has reached a desired target value. If the current of the battery has not reached the desired target value (e.g., the current is still above a desired target), operation continues to step 146; otherwise, if the current of the battery has reached the desired target value (e.g., the current has fallen to or below a desired target), operation jumps to step 147. In step 146, a determination is made whether the third time period has expired. If the third time period has not expired, operation jumps back or returns to step 145; otherwise, operation continues to step 147 and the voltage process is ended.

In various exemplary embodiments, during the voltage process performed in step 140, the second voltage is provided to the battery until the current of the battery drops to a desired value. In various exemplary embodiments, the second voltage is within the range of about 14.1 volts to about 16.0 volts. In various embodiments, the second voltage is further within the range of approximately 14.4 volts to approximately 15.6 volts. In various exemplary embodiments, the current starts at or below approximately 100 amps and tapers to a limit that is less than or about 1 amp. In various exemplary embodiments, the current ranges from approximately 60 amps to approximately 1 amp. The voltage process may take from between about 30 minutes to about 24 hours and may be ended, at least temporarily, after a certain or specified (e.g. preselected) time period, regardless of the then-present current level. In various exemplary embodiments, the voltage process is preset to be stopped after a time period between about 3 hours and about 5 hours.

Figure 5:
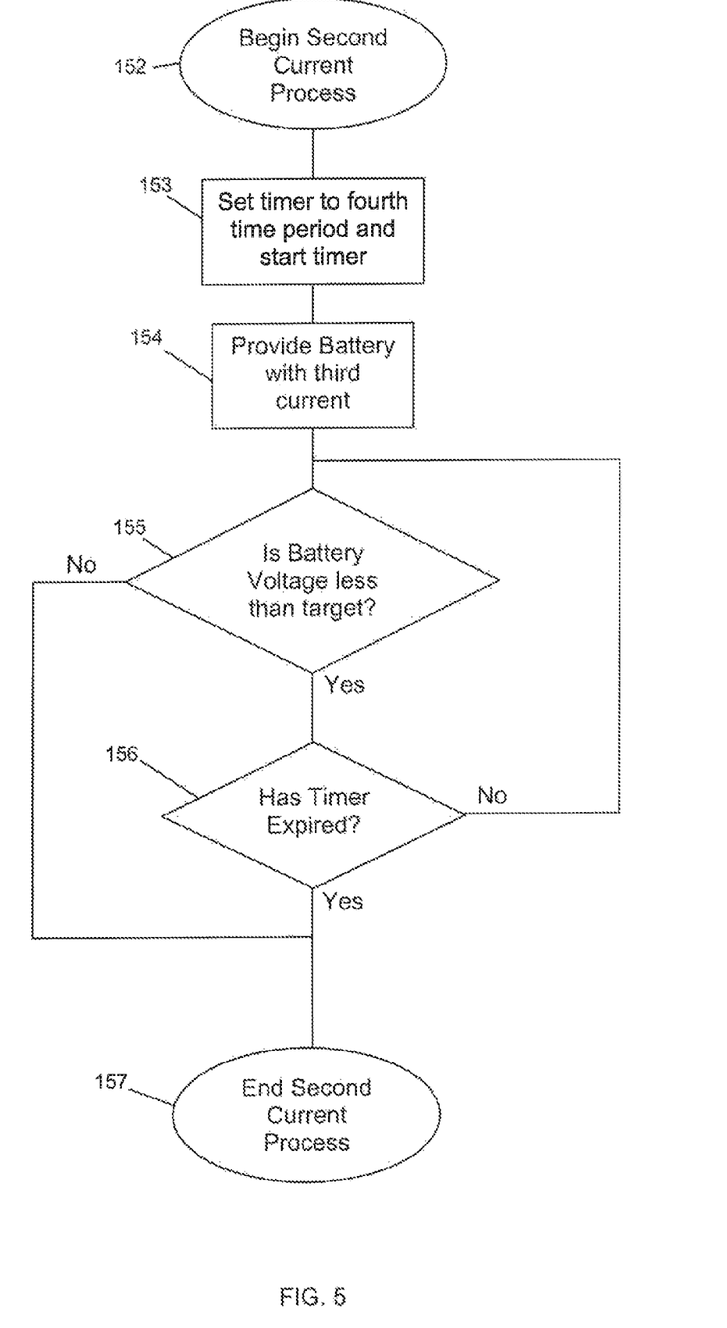
FIG. 5 is a flowchart representing a second current process according to an exemplary embodiment.

FIG. 5 is a flowchart outlining one exemplary embodiment of the second current process shown at step 150 in FIG. 1. As shown in FIG. 5, operation begins in step 152 and continues to step 153. In step 153, the timer is set to a fourth time period and the timer is started. In step 154, the battery is provided with a third current. Operation then continues to step 155.

It should be appreciated that, in various exemplary embodiments, the third current is substantially constant. As such, while the third current is applied to the battery, the voltage of the battery tends to increase. In step 155, a determination is made whether the present voltage of the battery has reached a desired target value. If the voltage of the battery has not reached the desired target value (e.g., the voltage is still below a desired target), operation continues to step 156; otherwise, if the voltage of the battery has reached the desired target value (e.g., the voltage has risen up to or above a desired target), operation jumps to step 157. In step 156, a determination is made whether the fourth time period has expired. If the fourth time period has not expired, operation jumps back to step 155; otherwise, operation continues to step 157 and the second current process is ended.

In various exemplary embodiments, during the second current process performed in step 150, the battery is provided with the third current until the voltage increases to about a specific or otherwise desired value. In various exemplary embodiments, the third current is approximately 3 amps and the desired voltage is within the range of about 14.5 volts to about 18.0 volts. In various exemplary embodiments, the third current is within the range of about 2 amps to about 4 amps and the desired voltage is within the range of about 17.5 volts to about 17.8 volts. In various embodiments, the second current process is preset to end, if it has not already done so, after approximately 2 hours, regardless of the then-present voltage. In various exemplary embodiments, the second current step may take about one hour and may be ended at least temporarily after a certain or specified (e.g. preselected) time period, regardless of the then-present voltage level.

Figure 6:
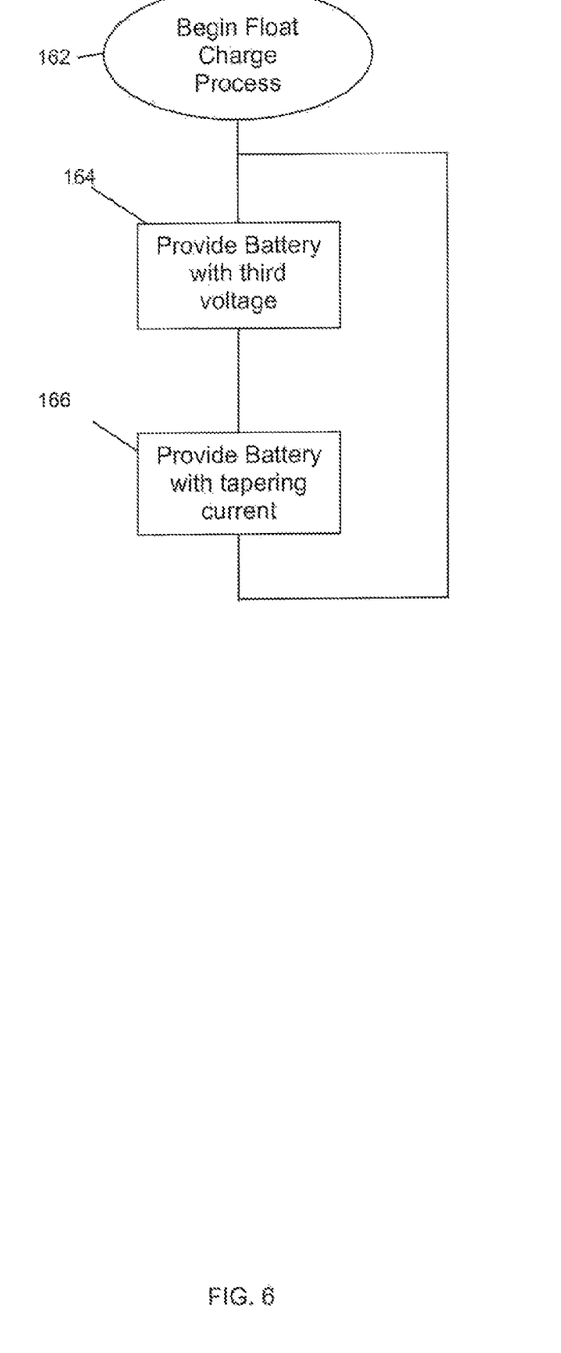
FIG. 6 is a flowchart representing a float charge process according to an exemplary embodiment.

FIG. 6 is a flowchart outlining one exemplary embodiment of the float charge process shown at step 160 in FIG. 1. As shown in FIG. 6, operation begins in step 162 and continues to step 164. In step 164, the battery is provided with a third voltage. In step 166, the amount of current supplied to the battery is limited to a fourth current. As shown in FIG. 6, operation loops through steps 164 and 166, with the third voltage provided to the battery to a limit of the fourth current, for as long as the battery remains connected to the battery charger. It should be appreciated that, in various exemplary embodiments, step 166 may be omitted. In this case, the current provided to the battery is not limited. It should also be appreciated that, in various exemplary embodiments, the current may taper (e.g., decrease over time) while the third voltage is provided to the battery.

In various exemplary embodiments, during the float charge process shown in step 160, the battery is provided with a voltage between about 13.2 volts and about 13.8 volts at a current of up to about 1 amp. In various embodiments, the float charge process provides a voltage of between about 13.5 volts and about 13.8 volts at a current between about 0.5 amps to about 1 amp. The float charge process may not have a time limit and may be continued indefinitely until the battery is disconnected from the charger.

Figure 7A:
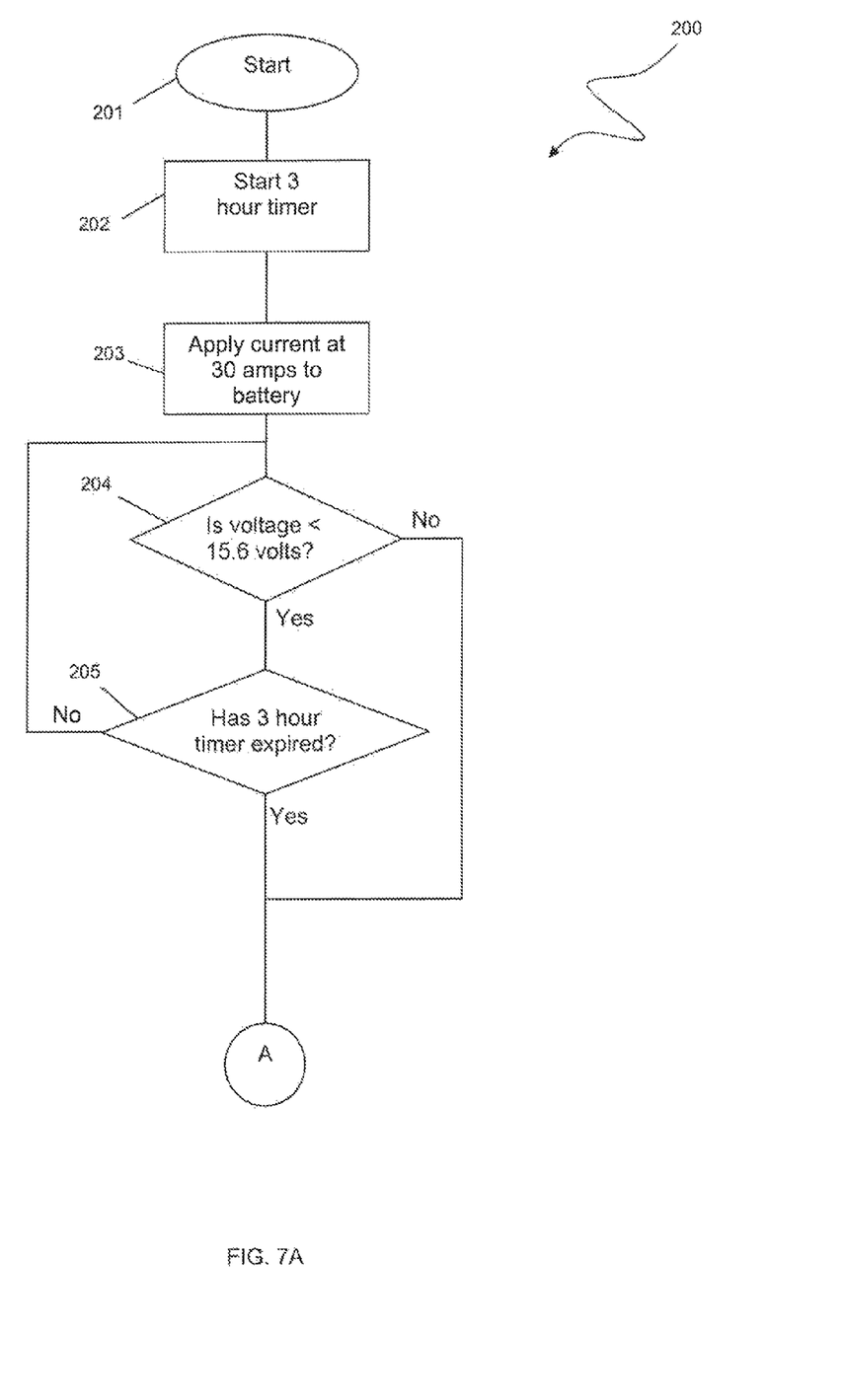
FIG. 7 is a flowchart representing a charging method according to a second exemplary embodiment.
Figure 7B:
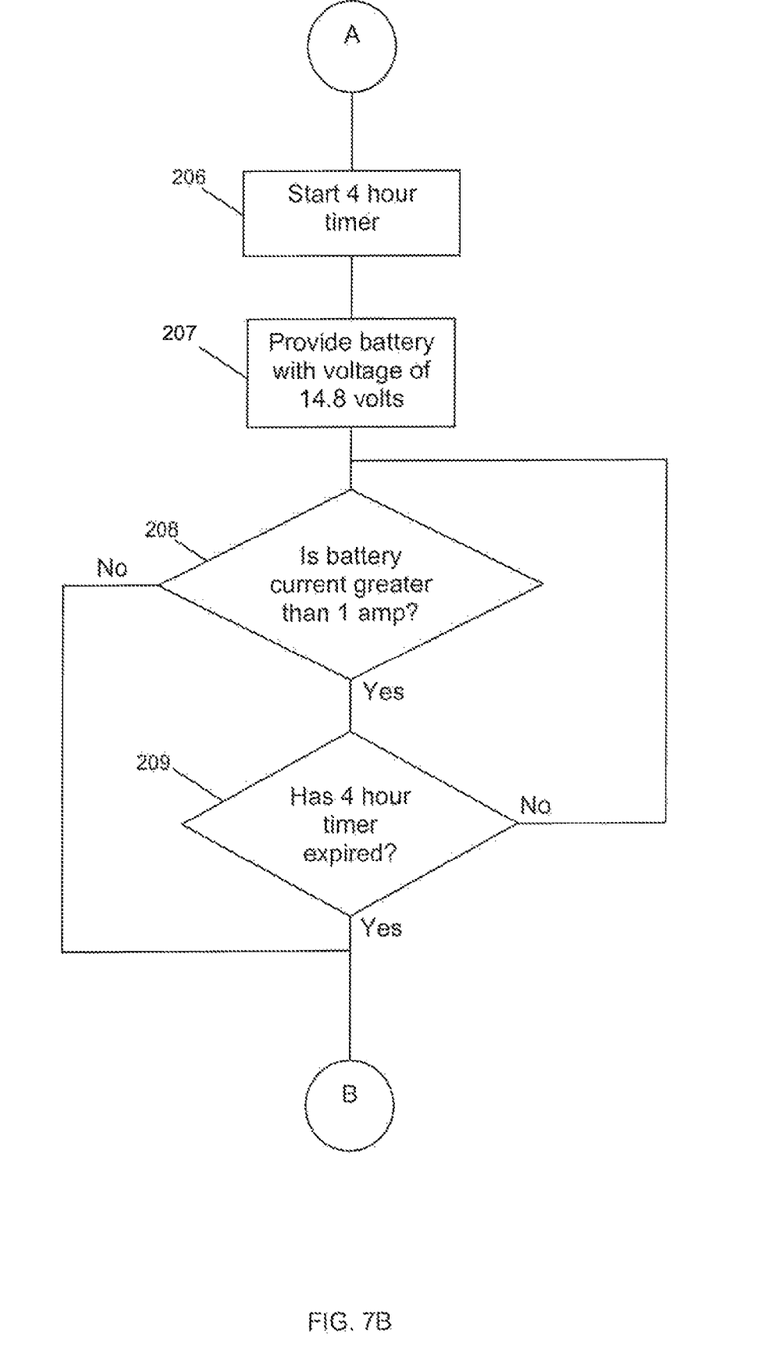
Figure 7C:
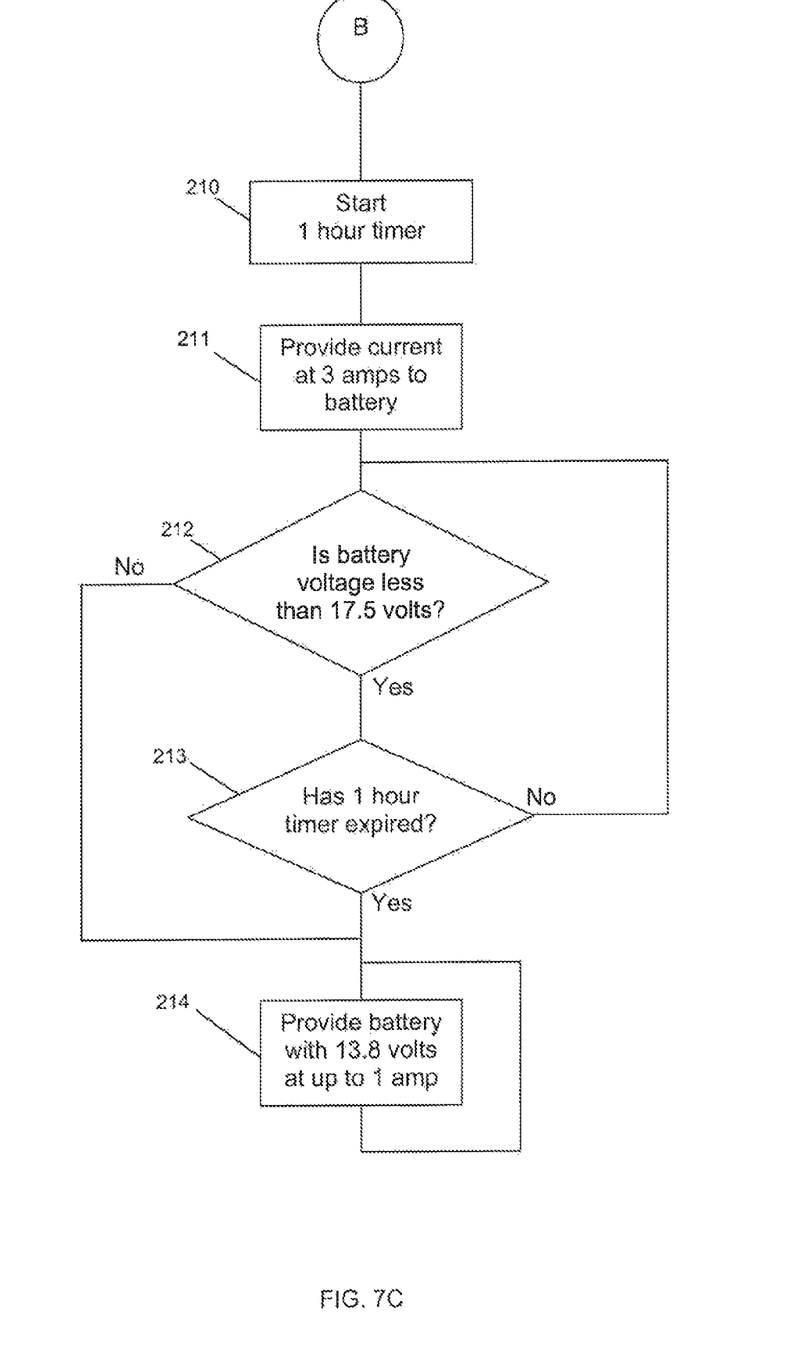

FIG. 7 shows a flowchart of a charging method 200 according to a second exemplary embodiment. As shown in FIG. 7, the charging method 200 begins in step 201 and continues to step 202, where a 3 hour timer is started. Then, in step 203, a substantially constant current of approximately 30 amps is applied to the battery. In this exemplary embodiment, the current is applied until the voltage of the battery increases to approximately 15.6 volts or the three hour timer expires. As such, in step 204, a determination is made whether the voltage is less than 15.6 volts. If the voltage is less than 15.6 volts, operation continues to step 205; otherwise, if the voltage is not less than 15.6 volts, operation jumps to step 206. In step 205, a determination is made whether the 3 hour timer has expired. If the 3 hour timer has expired, operation continues to step 206; otherwise, if the 3 hour timer has not expired, operation jumps back to step 204.

It should be appreciated that, in various other embodiments, the substantially constant current applied in step 203 may be approximately 25 amps. In various exemplary embodiments, if the temperature of the battery rises to above about 125 deg F, the applied current is, at least temporarily, removed from the battery until the temperature falls to a desired level, in a similar manner to that shown in FIG. 3. In various embodiments, if the 3 hour timer has not expired, the applied current may be reapplied after the temperature falls to the desired level.

At step 206, a 4 hour timer is started. Next, in step 207, a substantially constant voltage of approximately 14.8 volts is applied to the battery. In various exemplary embodiments, the current available to the battery in step 207 may be capped at a maximum of approximately 30 amps. Then, in step 208, a determination is made whether the current of the battery is greater than about 1 amp. If the current is greater than about 1 amp, operation continues to step 209. Otherwise, if the current of the battery is not greater than about 1 amp, operation jumps to step 210. In step 209, a determination is made whether the 4 hour timer has expired. If the 4 hour timer has expired, operation continues to step 210; otherwise, operation jumps back to step 208.

In step 210, a 1 hour timer is started. Then, in step 211, the battery is provided with a substantially constant current of approximately 3 amps. Next, in step 212, a determination is made whether the voltage of the battery is less than 17.5 volts. If the voltage is less than 17.5 volts, operation continues to step 213; otherwise, if the voltage of the battery is not less than 17.5 volts, operation jumps to step 214. In step 213, a determination is made whether the 1 hour timer has expired. If the 1 hour timer has expired, operation continues to step 214; otherwise, if the 1 hour timer has not expired, operation jumps back to step 212.

In step 214, a substantially constant voltage of approximately 13.8 volts is applied to the battery at a current of up to about 1 amp. As shown in FIG. 7, the approximately 13.8 volts may be provided to the battery indefinitely and/or until the battery is removed from the charger.

Figure 8:
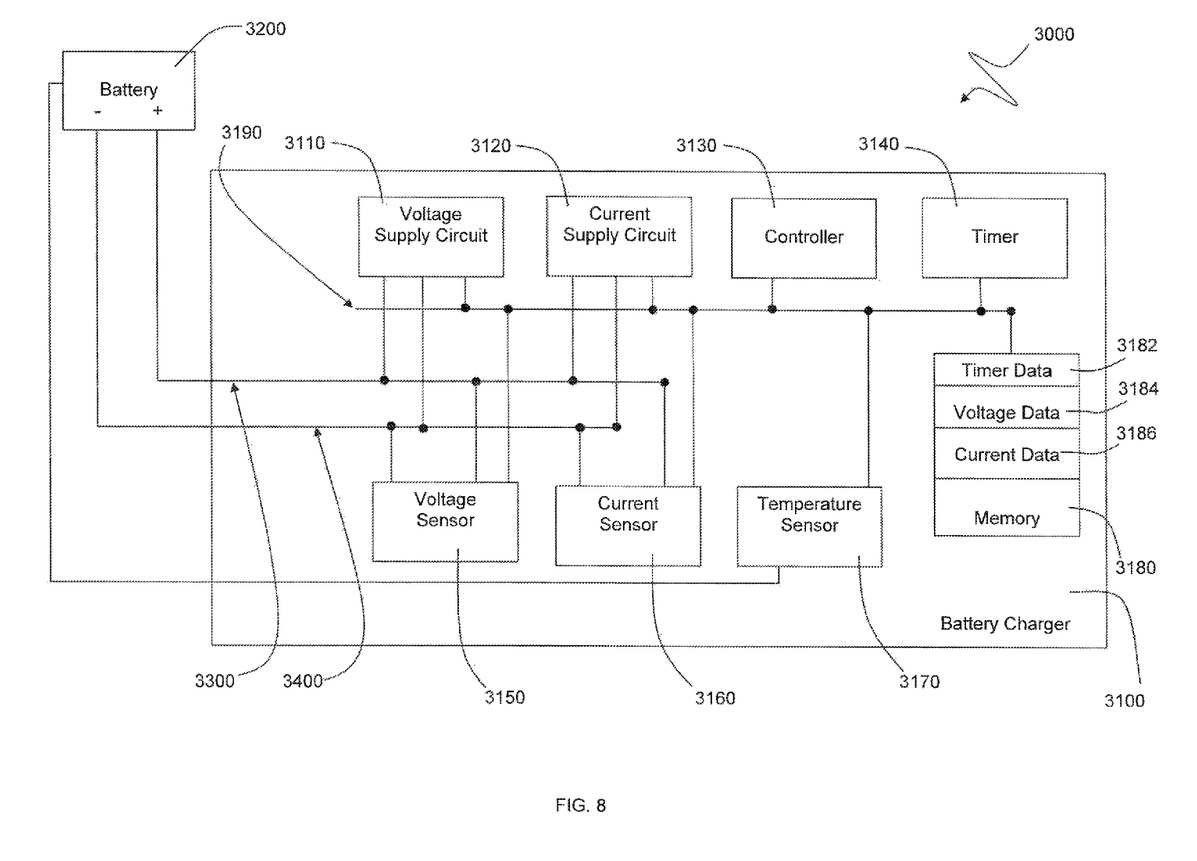
FIG. 8 is a schematic representation of a battery charging system according to an exemplary embodiment.

FIG. 8 is a block diagram of an exemplary embodiment of a battery charging system 3000 including a battery charger 3100 and a battery 3200. As shown in FIG. 8, a positive lead 3300 and a negative lead 3400 are provided between the battery 3200 and the battery charger 3100. Typically, the positive lead 3300 and the negative lead 3400 connect to terminals or similar structures on the exterior of the battery 3200. The leads 3300 and 3400 may include wires, cables, clamps, alligator clips, plugs and/or any other suitable known or later-developed electrical connection.

As shown in FIG. 8, the battery charger 3100 includes a voltage supply circuit 3110, a current supply circuit 3120, a controller 3130, a timer 3140, a voltage sensor 3150, a current sensor 3160, a temperature sensor 3170 and a memory 3180.

The voltage supply circuit 3110, the current supply circuit 3120, the controller 3130, the timer 3140, the voltage sensor 3150, the current sensor 3160, the temperature sensor 3170 and the memory 3180 are each connected to a communications bus 3190. The communications bus 3190 allows each component of the battery charger 3100 to send and/or receive information (e.g., readings, control signals, instructions, data, etc.) to and/or receive information from another component of the battery charger 3100. For example, the controller 3130 may send instructions to and/or control the current supply circuit 3120 regarding a desired current to be provided to the battery 3200. It should be appreciated that, while the communications bus 3190 is shown as a single wire, the communications bus 3190 may include any number of wires suitable for any desired known or later-developed communications bus and/or protocol (e.g., 1-wire, $I^2C$, PCI Express, Serial Peripheral Interface Bus, etc.).

It should also be appreciated that various components of the battery charger 3100 may be combined or integrated together. For example, in various exemplary embodiments, a single circuit may replace the voltage supply circuit 3110 and the current supply circuit 3120. In various exemplary embodiments, at least some of the components of the battery charger 3100 are elements of a microcontroller, a microprocessor and/or any other suitable known or later-developed controller.

The voltage supply circuit 3110, the current supply circuit 3120, the voltage sensor 3150 and the current sensor 3160 are each also connected to the positive lead 3300 and the negative lead 3400. At various desired times and/or for various desired periods, the voltage supply circuit 3130 provides a desired voltage between the positive and negative leads 3300 and 3400, and thus between the positive and negative connections of the battery 3200. Likewise, at various desired times and/or for various desired periods, the current supply circuit 3120 provides a desired current to the positive and negative leads 3300 and 3400, and thus to the positive and negative connections of the battery 3200.

In various exemplary embodiments, the memory 3180 includes timer data 3182. The timer data 3182 may include information regarding desired time periods to set for the timer 3140 during various stages of charging the battery 3200 (e.g., a starting value for a count-down timer or an ending value for a count-up timer). In various exemplary embodiments, the memory 3180 also includes voltage data 3184. The voltage data 3184 may include desired voltages to apply to the battery 3200 during various stages of charging the battery 3200, desired target voltages during other stages of charging the battery 3200 and/or historic values of voltages sensed by the voltage sensor 3150. In various exemplary embodiments, the memory 3180 also includes current data 3186. The current data 3186 may include desired current values to apply to the battery 3200 during various stages of charging the battery 3200, desired current limits and/or targets during other stages of charging the battery 3200 and/or historic values of currents sensed by current sensor 3160.

As shown in FIG. 8, the temperature sensor 3170 is also connected to the battery 3200. The temperature sensor senses, monitors, records and/or determines the temperature of the battery 3200. It should be appreciated that the temperature sensor 3170 may be directly coupled to the battery 3200, as shown in FIG. 8. In various other exemplary embodiments, the temperature sensor 3170 is at least indirectly thermally coupled to the battery 3200. In various other exemplary embodiments, the temperature sensor 3170 is capable of determining the temperature of the battery 3200 from a distance without being directly or indirectly thermally or electrically coupled to the battery 3200 (e.g., the temperature sensor 3170 may utilize a laser and/or infrared based temperature system). In various other exemplary embodiments, the temperature sensor 3170 may be integral to the battery 3200 and may be electrically connected to the battery charger 3100.

In an exemplary method of utilizing the battery charging system 3000 shown in FIG. 8, the battery 3200 is coupled to the battery charger 3100 to be charged. In various exemplary embodiments, the controller 3130 controls the current supply circuit 3120, the voltage sensor 3150 the timer 3140 and/or the temperature sensor 3170 to charge the battery 3200 using a first current process or routine that uses a first set of current, voltage, timer and temperature parameters stored in the memory 3180. In various embodiments, during the first current process or routine, the current supply circuit 3120 provides a current between the positive lead 3300 and the negative lead 3400 with a value of approximately 30 amps and the timer 3140 is set to a time period of approximately 3 hours.

In various exemplary embodiments, the current supply circuit 3120 provides the current between the positive lead 3300 and the negative lead 3400 until the voltage sensor 3150 indicates that the voltage of the battery 3200, has reached a desired value of approximately 15.6 volts.

In various exemplary embodiments, if the temperature sensor 3170 indicates that the temperature of the battery 3200 reaches a value of approximately 125 deg F, the current provided by the current supply circuit 3120 is set to 0 until the temperature sensor 3170 indicates that the temperature of the battery 3200 has fallen to a desired level. After the temperature of the battery 3200 has fallen to the desired value, the current supply circuit 3120 may then again reapply the current of the previous value.

In various exemplary embodiments, after either the voltage sensor 3150 indicates that the voltage of the battery 3200 has reached the desired value (e.g., approximately 15.6 volts) or the timer 3140 expires, the controller 3130 controls the voltage supply circuit 3110, the current sensor 3160 and the timer 3140 to charge the battery 3200 using a voltage process or routine that uses a second set of current, voltage and timer parameters stored in the memory 3180. In various exemplary embodiments, the timer 3140 is set to a time period of approximately 4 hours. In various exemplary embodiments, during the voltage process or routine, the voltage supply circuit 3110 provides a voltage of approximately 14.8 volts between the positive lead 3300 and the negative lead 3400. In various exemplary embodiments, the current supply circuit 3120 additionally limits the available current between the positive lead 3300 and the negative lead 3400 to approximately 30 amps.

In various exemplary embodiments, the voltage process or routine continues until either the current sensor 3160 indicates that the current of the battery 3200 has fallen to a value less than approximately 1 amp or the timer 3140 expires. In various exemplary embodiments, the controller 3130 then controls the current supply circuit 3120, the voltage sensor 3150 and the timer 3140 to charge the battery 3200 using a second current process or routine that uses a third set of current, voltage and timer parameters stored in the memory 3180.

In various exemplary embodiments, at the beginning of the second current process or routine, the timer 3140 is set to a time period of approximately 1 hour. In various exemplary embodiments, during the second current step, the current supply circuit 3120 provides a current of approximately 3 amps between the positive lead 3300 and the negative lead 3400. In various exemplary embodiments, the current supply circuit 3120 provides the 3 amps of current until either the voltage sensor 3150 indicates that the voltage of the battery 3200 has reached approximately 17.5 volts or the timer 3140 has expired.

In various exemplary embodiments, the controller 3130 then controls the voltage supply circuit 3110 and the current supply circuit 3120 using a float charge process or routine that uses a fourth set of voltage and current parameters stored in the memory 3180. In various exemplary embodiments, during the float charge process or routine, the voltage supply circuit 3110 provides a voltage of approximately 13.8 volts between the positive lead 3300 and the negative lead 3400. In various exemplary embodiments, the current supply circuit 3120 additionally limits the current between the positive lead 3300 and the negative lead 3400 to no more than approximately 1 amp, while allowing the current to taper lower. In various exemplary embodiments, the controller 3130 continues executing the float charge process or routine for as long as the battery 3200 remains connected to the battery charger 3100.

It should be appreciated that the above-outlined method of using the battery charging system 3000 is only exemplary. In general, the battery charger 3100 of the battery charging system 3000 may utilize any of the above-outlined or other exemplary methods of charging a battery to charge the battery 3200.

It should be appreciated that the above-outlined timers and time periods (e.g., the timer 3140, the first time period, the second time period, the third time period and the fourth time period) may utilize any known or later-developed timing device(s) and/or mechanism(s). Any particular time period may be tracked utilizing a count-up method, in which the time period ends when a timer reaches a desired value. Likewise, any particular time period may be tracked utilizing a count-down method, in which the timer period ends when a timer reaches zero. In various embodiments, each timer/time period is a function of one or more real time clock(s). In various embodiments, the real time clock is a function of or operably connected to a processor of the battery charger.

It should be appreciated, that the various steps of the various processes may be performed in any order and/or simultaneously. For example, in various processes, the battery charger may simultaneously monitor a voltage and/or a current of the battery as well as a timer to determine whether the present process should be ended. In various exemplary embodiments, if any parameter indicates that the present process should be ended, that process is ended regardless of the condition of any other parameters.

As shown in FIG. 8, one or more of the elements 3110-3190 of the battery charger 3100 can be implemented using a programmed general-purpose or special-purpose microprocessor, microcontroller, digital signal processor or the like. Alternatively, one or more of the elements 3110-3190 of the battery charger 3100 can be implemented using an ASIC or other integrated circuit, a hardwired electronic or logic circuit such as a discrete element circuit, a programmable logic device, such as, but not limited to, a PLD, PLA, FPGA or PAL, or the like. In general, any device, capable of implementing a finite state machine that is in turn capable of implementing the flowcharts shown in FIGS. 1-7, can be used to implement one or more of the elements 3110-3190 of the battery charger 3100. It should further be appreciated that, in place of a distinct and separately-identifiable controller 3110, the various control functions described with respect to the controller 3110 above can be distributed and implemented in various ones of the circuits 3110 and 3120, the timer 3140 and/or the sensors 3150-3170.

It should be understood that one or more of the various elements, such as the controller 3130, the circuits 3110 and/or 3120, the timer 3140 and/or the sensors 3150-3170 can be implemented as software (e.g., routines, applications, objects, procedures or managers) stored on a computer readable medium that is executable on a programmed general-purpose computer or special-purpose microprocessor, microcontroller, digital signal processor or the like. The particular form of the circuits, routines, applications, objects, procedures or managers shown in FIG. 8 will take is a design choice and will be obvious and predictable to those skilled in the art. It should be appreciated that the circuits, routines, applications, objects, procedures or managers shown in FIG. 8 do not need to be of the same design.

It should be appreciated that a routine, application, manager, procedure, object or the like can be a self-consistent sequence of processor-implemented steps that lead to a desired result. These steps can be defined by and/or in one or more computer instructions stored in a computer readable medium. These steps can be performed by a processor executing the instructions that define the steps. Thus, the terms "routine", "application", "manager", "procedure", and "object" can refer to, for example, a sequence of instructions, a sequence of instructions organized within a programmed-procedure or programmed-function, and/or a sequence of instructions organized within programmed processes. Such routines, applications, managers, procedures, objects or the like can also be implemented directly in circuitry that performs the procedure. Further, these processor-controlled methods can be performed by a processor executing one or more appropriate programs, by special purpose hardware designed to perform the method, or any combination of such hardware, firmware and software elements.

As shown in FIG. 8, the memory 3180 can be implemented using any appropriate combination of alterable, volatile or non-volatile memory or non-alterable, or fixed, memory. The alterable memory, whether volatile or non-volatile, can be implemented using any one or more of static or dynamic RAM, a hard drive, flash memory or the like. Similarly, the non-alterable or fixed memory can be implemented using any one or more of ROM, PROM, EPROM, EEPROM or the like.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The invention claimed is:

1. A method of charging a lead-acid battery utilizing a charging device comprising:
providing the lead-acid battery with a first substantially constant current of approximately 30.0 amps;
determining if a voltage of the lead-acid battery reaches approximately 15.6 volts;
terminating application of the first current if the lead-acid battery is not less than 15.6 volts, and not later than approximately 3.0 hours have elapsed;
providing the lead-acid battery with a first substantially constant voltage of approximately 14.8 volts at an initial current of no more than approximately 30.0 amps;
determining if the current of the lead-acid battery is greater than approximately 1.0 amps;
terminating application of the first voltage if the current of the lead-acid battery is not greater than 1.0 amps, and not later than approximately 4.0 hours have elapsed;
providing the lead-acid battery with a second substantially constant current of approximately 3.0 amps;
determining if the voltage of the lead-acid battery reaches approximately 17.5 volts;
terminating application of the second current if the lead-acid battery is not less than 17.5 volts, and not later than approximately 1.0 hours have elapsed; and
providing the lead-acid battery with a second substantially constant voltage of approximately 13.8 volts at a current of no more than approximately 1.0 amps.

2. The method of claim 1, further comprising:
initiating a first timer for measuring a first time period;
terminating application of the first substantially constant current upon completion of the first time period;
initiating a second timer for measuring a second time period;
terminating application of the first substantially constant voltage upon completion of the second time period;

initiating a third timer for measuring a third time period; and terminating application of the second substantially constant current upon completion of the third time period.

3. The method of claim 1, further comprising:

setting a timer to a first time period and starting the timer; and applying the first substantially constant current to a lead-acid battery during the first time period until either a voltage of the lead-acid battery reaches a desired value or the first time period expires regardless of the then-present voltage level.

4. The method of claim 1 wherein applying the first substantially constant voltage to the lead-acid battery comprises setting the timer to a second time period and starting the timer, applying the first substantially constant voltage to the battery at the initial current during the second time period until either the current reaches a desired value or the second time period expires regardless of the then-present current level.

5. The method of claim 1 wherein applying the second substantially constant current to the lead-acid battery comprises setting the timer to a third time period and starting the timer, applying the second substantially constant current to the battery during the third time period until either a voltage of the lead-acid battery reaches a desired value or the third time period expires regardless of the then-present voltage level.

6. The method of claim 1 wherein the second substantially constant voltage at a current of no more than approximately 1.0 amps is a generally tapering current.

7. The method of claim 1 further comprising applying a third substantially constant voltage or a third substantially constant current to the lead-acid battery for a desired time period before providing the lead-acid battery with the first substantially constant current.

8. The method of claim 7 wherein the third substantially constant voltage is greater than approximately 15.3 volts and less than approximately 18.0 volts, the third substantially constant current is greater than approximately 0.5 amps and less than approximately 3 amps and the desired time period is greater than approximately 15 minutes and less than approximately 48 hours.

9. The method of claim 1 further comprising:

removing the first substantially constant current from the lead-acid battery before applying the first constant voltage to the lead-acid battery;

removing the first constant voltage from the lead-acid battery before applying the second substantially constant current to the lead-acid battery; and removing the second substantially constant current from the lead-acid battery before applying the second substantially constant voltage to the lead-acid battery.

10. A method of charging a lead-acid battery utilizing a charging device comprising:

providing the lead-acid battery with a substantially constant current of approximately 30.0 amps until either a voltage reaches approximately 15.6 volts or approximately 3.0 hours have elapsed regardless of the then-present voltage level;

providing the lead-acid battery with a substantially constant voltage of approximately 14.8 volts at an initial current of no more than approximately 30.0 amps until either the current is less than approximately 1.0 amps or approximately 4.0 hours have elapsed regardless of the then-present current level;

providing the lead-acid battery with a substantially constant current of approximately 3.0 amps until either a voltage reaches approximately 17.5 volts or approximately 1.0 hours have elapsed regardless of the then-present voltage level; and providing the lead-acid battery with a substantially constant voltage of approximately 13.8 volts at a current of no more than approximately 1.0 amps.

11. The method of claim 10, wherein:

the substantially constant current of approximately 30.0 amps is a first substantially constant current;

the substantially constant voltage of approximately 14.8 volts is a first substantially constant voltage; and the substantially constant current of approximately 3.0 amps is a second substantially constant current: and the substantially constant voltage of approximately 13.8 volts is a second substantially constant voltage.

12. The method of claim 11, further comprising:

initiating a first timer for measuring a first time period;

terminating application of the first substantially constant current upon completion of the first time period;

initiating a second timer for measuring a second time period;

terminating application of the first substantially constant voltage upon completion of the second time period;

initiating a third timer for measuring a third time period; and terminating application of the second substantially constant current upon completion of the third time period.

13. The method of claim 11, further comprising:

setting a timer to a first time period and starting the timer: and applying the first substantially constant current to a lead-acid battery during the first time period until either a voltage of the lead-acid battery reaches a desired value or the first time period expires regardless of the then-present voltage level.

14. The method of claim 11 wherein applying the first constant voltage to the lead-acid battery comprises setting the timer to a second time period and starting the timer, applying the first substantially constant voltage to the battery at the initial current during the second time period until either the current reaches a desired value or the second time period expires regardless of the then-present current level.

15. The method of claim 11 wherein applying the second substantially constant current to the lead-acid battery comprises setting the timer to a third time period and starting the timer, applying the second substantially constant current to the battery during the third time period until either a voltage of the lead-acid battery reaches a desired value or the third time period expires regardless of the then-present voltage level.

16. The method of claim 10 wherein the substantially constant voltage of approximately 13.8 volts at a current of no more than approximately 1.0 amps is a generally tapering current.

17. The method of claim 11 further comprising applying a third substantially constant voltage or a third substantially constant current to the lead-acid battery for a desired time period before providing the lead-acid battery with the first substantially constant current.

18. The method of claim 17 wherein the third substantially constant voltage is greater than approximately 15.3 volts mad less than approximately 18.0 volts, the third substantially constant current is greater than approximately 0.5 amps and less than approximately 3 amps and the desired time period is greater than approximately 15 minutes and less than approximately 48 hours.

19. The method of claim 11 further comprising:
removing the first substantially constant current from the lead-acid battery before applying the first constant voltage to the lead-acid battery;
removing the first constant voltage from the lead-acid battery before applying the second substantially constant current to the lead-acid battery; and
removing the second substantially constant current from the lead-acid battery before applying the second substantially constant voltage to the lead-acid battery.

* * * * *